United States Patent

[11] 3,570,448

[72] Inventor  Robin Ian Yeoman Gates
             22 Station Road, Redhill, Surrey, England
[21] Appl. No. 880,562
[22] Filed     Nov. 28, 1969
[45] Patented  Mar. 16, 1971
[32] Priority  Nov. 29, 1968
[33]           Great Britain
[31]           56760/68

[54] DEVICE FOR HERD MANAGEMENT
     3 Claims, 3 Drawing Figs.
[52] U.S. Cl. .................................................. 116/133,
                                                    40/110, 235/85
[51] Int. Cl. ................................................. G09f 9/00
[50] Field of Search ........................................ 116/114,
            133; 40/110; 119/(Inquired); 235/85 (RC), 88,
                                                            78, 84

[56]           References Cited
               UNITED STATES PATENTS
     1,495,805  5/1924  Rooney ....................... 235/84
     3,374,948  3/1968  McColm ...................... 235/88
     3,406,474 10/1968  Bates .......................... 40/110

Primary Examiner—Louis J. Capozi
Attorney—Stowell & Stowell

ABSTRACT: A device for herd management, particularly herds of cows, which records the offspring producing cycle, comprising a board and a transparent disc mounted at its center for rotation over one face of the board, the board having markings thereon representing observations and steps to be taken with an animal, these markings being arranged coordinate with markings on the disc representing days and months of the year; and marker members for attachment to the disc representing an animal.

Patented March 16, 1971

3,570,448

DEVICE FOR HERD MANAGEMENT

This invention relates to a device for herd management and particularly to a device for recording the offspring-producing cycle in domestic animals. The device is primarily intended as an aid to the herdsman for the planning of a dairy herd, the calving index and other relevant information being readily available and the condition of individual cows being easily and rapidly identified at any stage in their cycle throughout the year.

Devices for recording the offspring-producing cycle of a herd of cows are already known but these devices have certain disadvantages, for example, the various marker members which are employed to identify individual cows may easily become misplaced and this would completely ruin a herdsman's record of his herd. Also, it is advantageous for the herdsman to have readily available to him information regarding what stage a cow has reached in the calving cycle, what steps have been taken, what steps have to be taken and what condition the cow is in and various other factors which enable the herdsman to plan the treatment of his herd so that optimum monetary return will result.

It is the main object of this invention to provide a device for recording the offspring-producing cycle in domestic animals and particularly cows which overcomes the above-mentioned difficulties and gives the herdsman the information he requires.

According to the present invention there is provided a device for recording the offspring-producing cycle in domestic animals, comprising a board and a transparent disc mounted at its center for rotation over one face of the board, the board having markings thereon which represent the various observations and steps to be taken with an animal during its offspring-producing cycle, the said markings on the board being arranged coordinate with markings on the disc representing days and months of the year and a plurality of marker members each representing and identifying an animal, said marker members being capable of attachment to the disc and movable with the disc in relation to the board.

One example of a device in accordance with the invention will now be described by way of example and with reference to the accompanying drawing, in which.

Figure 1:
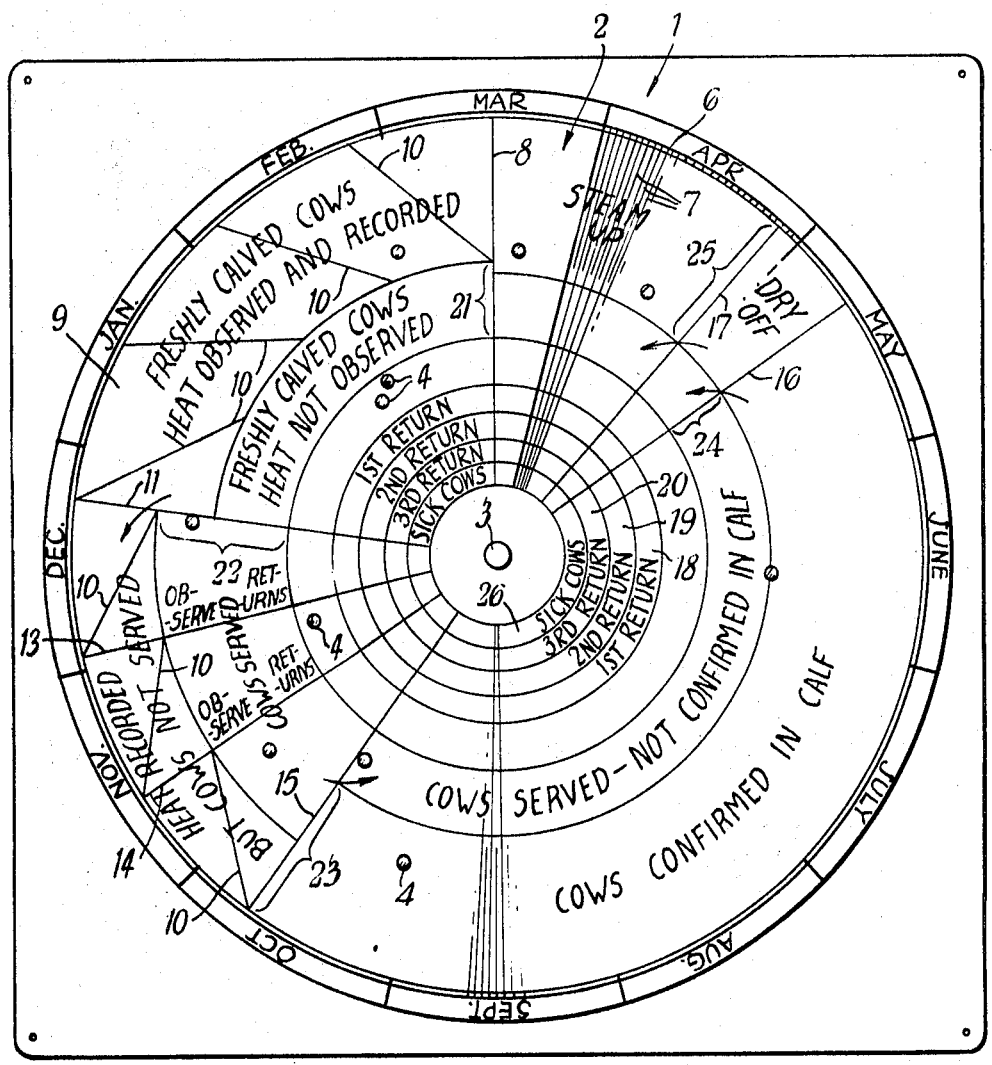
FIG. 1 is a top view of a device in accordance with the invention.
Figure 2:
FIG. 2 is a side view of the device of FIG. 1.
Figure 3:
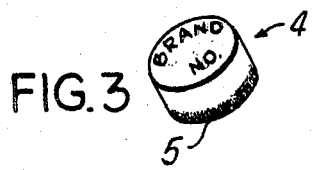
FIG. 3 is a perspective view of the marker member.

In the drawing, the device comprises a board 1 made of any suitable material, for example plastics or wood, and a disc 2 of a transparent material, for example plastics, and mounted on one face of the board 1 to rotate about a center pivot 3. The device also includes a plurality of marker members 4, each representing an individual cow and identifying that cow by a number corresponding to the brand number of the cow. The marker member 4 is coated with an adhesive 5 being adhesively or otherwise temporarily secured to the disc 2.

The periphery of the disc 2 is divided, as indicated at 6 in FIG. 1, into the days and months of the year. Arranged radially are lines 7, each line 7 corresponding to one of the days in the year. The disc 2 is friction held by the pivot 3 in any particular relationship with the board 1, although the pivot 3 is of such a nature that the herdsman may manually move the disc 2 in relation to the board.

Behind the disc 2 and on the exposed face of the board 1, are markings representing the various observations and steps to be taken by the herdsman with his cows. There is a radial line 8 which represents today's date and each day the herdsman will move the disc 2 so that today's date overlies the line 8. The board is also divided into a series of concentric circular areas which are subdivided by radial lines. In the circular area 9 there are eight lines 10 extending over a period of 21 days. The fourth period of 21 days terminates at the radial line 11 by which date the cow should be served. There are also two further radial lines 13 and 14, 21 days and 42 days respectively after the service date indicated by line 11 and there is also a further radial line 15 21 days after the line 14. At further appropriate time intervals are two further lines 16 and 17 representing the dates when the cow should be dried off and steamed up ready for calving. Towards the center of the board are three circular areas 18, 19 and 20 representing first, second and third service returns respectively.

As an illustration as to how the device operates, the complete calving cycle of a cow will now be described.

When the cow calves her marker member 4 is placed on the disc 2 along the line 8 along the part of this line marked 21. Thereby, as the days go by and the disc 2 moves anticlockwise in relation to the board 1, the marker member representing the cow will move into the "freshly calved cows heat not observed" area. When oestrus is observed the marker member 4 is moved from this area and moved outwardly taking care to stay on the same day and replaced on the disc at the line 10 which crosses that day's date. Now that the cow has been observed in heat, as the disc 2 moves round day by day, every 21 days the cow's marker member will pass over a line 10 and in this way the heat period of the majority of cows can be accurately charted in advance. When the cow has calved for two periods of 21 days, she will be entering the critical stage where she will have to be served on her next heat period so that she will calve down on time and as her marker member moves close to the line 10 crossing the path of movement of the marker member, the herdsman can watch the cow closely. Frequently, especially in the winter time, cows are not obviously seen as being in heat and therefore in this way the cow can be shown to the bull and served regardless of whether she is obviously in heat or not to the herdsman and in most cases the herdsman will be correct in his planning.

If the cow is still in the "freshly calved cows heat not observed" area by the time she has reached the two months stage after calving, then it will be clear to the herdsman that there is something physically wrong with the cow and the vet will be called in to examine her.

The day that the cow is actually served her marker member is removed from the disc and placed on the line 11 along that portion of this line marked 22 as this line 22 is 283 days from the radial line 8 in an anticlockwise direction. 283 days is the gestation period of the average cow, therefore indicating to the herdsman, on service day, the date the cow is due to calve. Twenty-one days after the cow has been served the marker member will pass over the line 13 and this will give the herdsman the opportunity of observing the cow to see if she shows signs of being in heat. If she shows signs of being in oestrus he can assume that the service was unsuccessful and the cow will have to be served again. If this happens the marker member is removed from the disc and replaced on the disc along the line 11 but this time over the "first return" area. If this happens again the marker member is returned to the "second return" and then the "third return" area and in this way the herdsman can quickly see which cows are proving to be difficult to get into calf and therefore holding back the profits of the herd. If, however, the cow shows no sign of being in heat, the herdsman will assume that the cow is in calf and when the marker member reaches the radial line 15 the vet will be called in to confirm by a pregnancy diagnosis whether the cow is actually in calf or not. If the cow is found to be in calf, her marker member will be placed along the part 23 of the line 15.

As the disc continues to revolve through the months, the cow's marker member eventually reaches the line 16 at which date the cow should be dried off and when this has been done the marker member is moved to the portion 24 along line 16. Two weeks later the marker member will reach the line 17 and the cow will have to be fed concentrates in order that she is in a good condition for calving in six to eight weeks time. At the line 17, when steaming up has been carried out, the marker member is moved to the portion 25 of line 17. The cow should then calve approximately 365 days after the last calving, thus completing the cycle.

If a farmer has only one herd, then the only identification on individual marker members that is required is the identifying number of the cow. However, if the farmer has more than one herd, then the numbers on the marker members may be colored or the faces of the marker members may be colored differently for each herd. Also, if a farmer wants to record his new heifers coming into the herd, a different colored marker member may be used. Different colored marker members may be used to indicate which bull has been used. There is also an inner area 26 marked on the board indicating "sick cows" which makes it simple for the herdsman to determine which cows need special attention.

It will be appreciated that although the device has been described in relation to planning of a dairy herd, the device is equally applicable to the planning of the offspring producing cycle of other domestic animals, for example, pigs. In the case of pigs, the device according to the invention has the added advantage that by using marker members of alternative colours to identify the boars, the value of a boar may be assessed by considering the conversion rate of its offspring.

I claim:

1. A device for recording the offspring-producing cycle in domestic animals, comprising a board and a transparent disc mounted at its center for rotation over one face of the board, the board having first markings thereon which represent observations and steps to be taken with an animal during its offspring-producing cycle, the said first markings on the board being viewable through said disc arranged coordinate with second markings on the disc said second markings representing days and months of the year and a plurality of marker members each representing and identifying an animal, said marker members being capable of attachment to the disc and movable with the disc in relation to the board.

2. A device as claimed in claim 1, in which some of the first markings on the board represent the oestrus days of an animal.

3. A device as claimed in claim 2, in which the days and months of the year are marked on the disc by radial lines, the first markings on the board representing oestrus days being nonradial lines each of which extends over the number of days on the disc in the oestrus cycle of the animal.